(12) United States Patent
Kadir et al.

(10) Patent No.: US 6,207,104 B1
(45) Date of Patent: Mar. 27, 2001

(54) TERNARY HYDROGEN STORAGE ALLOY AND PROCESS FOR PRODUCTION THEREOF

(75) Inventors: Abdulkarim Kadir; Itsuki Uehara; Tetsuo Sakai; Hideaki Tanaka, all of Ikeda (JP)

(73) Assignee: Agency of Industrial Science & Technology, Tokyo (JP)

( * ) Notice: Subject to any disclaimer, the term of this patent is extended or adjusted under 35 U.S.C. 154(b) by 0 days.

(21) Appl. No.: 09/407,066

(22) Filed: Sep. 28, 1999

(30) Foreign Application Priority Data

Sep. 29, 1998 (JP) .................................. 10-293006

(51) Int. Cl.[7] .............................. C22C 28/00; C01B 6/24
(52) U.S. Cl. ........................................... 420/416; 420/900
(58) Field of Search ...................................... 420/416, 900

(56) References Cited

U.S. PATENT DOCUMENTS

| | | | |
|---|---|---|---|
| 4,121,924 | * 10/1978 | de Barbadillo, II | 75/129 |
| 4,358,432 | * 11/1982 | Gamo et al. | 423/644 |
| 5,525,435 | * 6/1996 | Pourarian | 429/218 |
| 5,803,995 | * 9/1998 | Tanaka et al. | 148/437 |

OTHER PUBLICATIONS

Spassov, Koster: Thermal Stability and hydriding properties of nanocrystalline melt–spun Mg63Ni30Y7 alloy; (1998); Journal of Alloys and Compounds; 279–286.*

* cited by examiner

Primary Examiner—Roy V. King
(74) Attorney, Agent, or Firm—Arent Fox Kintner Plotkin & Kahn, PLLC

(57) ABSTRACT

An $AB_2C_2$-type ternary hydrogen storage alloy comprising an $AB_2C_2$ phase as main ingredient, where A comprises at least one of a rare-earth element and Ca, B mainly comprises Mg, and C comprises at least one of transition metal elements of Cu, Ni, Co, Fe, Cr, Mn, Ti, V and Zn, and x and y represent values within the-ranges of $1.5 \leq x \leq 2.5$ and $1.5 \leq y \leq 3.5$, respectively; and an $AB_2C_3$-type ternary hydrogen storage alloy comprising an $AB_2C_3$ phase as a main ingredient, where A comprises at least one of a rare-earth element and Ca, B mainly comprises Mg, and C comprises at least one of transition metal elements of Cu, Ni, Co, Fe, Cr, Mn, Ti, V and Zn, each of which has large hydrogen storage capability and desorbing amount per unit weight and hydrogen storage characteristics excellent in reversibility of the hydrogen absorption and desorption and is provided by improving the stability in a hydride state of an alloy mainly comprising a lightweight metal element and increasing the hydrogen dissociation pressure of the hydride.

9 Claims, 3 Drawing Sheets

Cu, Ti
Mg, Al
Cu
La

TERNARY HYDROGEN STORAGE ALLOY AND PROCESS FOR PRODUCTION THEREOF

BACKGROUND OF THE INVENTION

The present invention relates to a novel hydrogen storage alloy for use in apparatus for storing and transporting hydrogen and secondary batteries of hydrides, and also to a process for the production thereof.

Hydrogen storage alloys are materials for absorbing and desorbing a great amount of hydrogen reversibly, and binary intermetallic compounds and V-series solid solution alloys have been known, which include $AB_5$-type such as $LaNi_5$, $AB_2$-type such as $ZrMn_2$, AB-type such as TiFe and $A_2B$-type such as $Ti_2Ni$. Since hydrogen intrudes in the form of atom (H) into the interstices in crystal lattice of such hydrogen storage alloys to form metal hydride in an unstable bonding state, the alloys can absorb and desorb hydrogen repeatedly under a relatively mild condition to do with the temperature and the hydrogen pressure.

Further, the hydrogen absorbing characteristics of the alloys can be changed by substituting at least a portion of elements A and/or B with other elements. For example, in $LaNi_5$ series alloys put to practical use such as hydrogen storage media or nickel-metal hydride batteries, metallographic structures and hydrogen storage characteristics are controlled so as to satisfy particular requirements in particular applications by substituting La with a misch metal (Mm) which is a mixture of rare-earth elements in the A-sites and a portion of Ni with Co, Al, Mn, etc. in the B-sites, thereby making it multiple components.

However, in the practical hydrogen storage alloys, the rechargeable hydrogen storage capacity is as small as about H/M=1 in atomic ratio between hydrogen (H) and metal (M), that is, 1 to 2% in weight ratio. Such a small rechargeable hydrogen storage capacity per unit weight gives a significant drawback as hydrogen storage media.

$Mg_2Ni$ has been known as a lightweight hydrogen storage alloy. The alloy is superior to the hydrogen storage alloy above-mentioned in that the hydrogen storage capacity is as large as 3.6mass %. However, a high temperature is necessary to make the $Mg_2Ni$ alloys desorb hydrogen since its hydrogen dissociation pressure is 1 atm at about 250° C. This is because strongly basic Mg tends to easily donate electrons to become anionic ($H^-$) and form a hydride in a strong bonding state. Therefore, the hydrogen dissociation pressure changes scarcely even when Mg and/or Ni are partially substituted with other elements, which is different from the $LaNi_5$ series alloys in which hydrogen is absorbed atomically as H. Then, it has been said impossible to greatly lower the hydrogen desorbing temperature of the $Mg_2Ni$ series alloys.

In addition to $Mg_2Ni$, there are several binary alloys consisting of lightweight Mg or Ca as a main ingredient and forming hydrides. However, any of the alloys above-mentioned changes into an amorphous state or decomposes disproportionately into a stable hydride such as $MgH_2$ or $CaH_2$. For example, as reported in the treatise (Journal of Alloys and Compounds, vol 253–254 (1997), p. 313), $LaMg_2$ absorbs hydrogen to form $LaMg_2H_7$, which shows a very large amount of hydrogen storage capacity in the Laves phase alloys, of H/M≧2 in atomic ratio, that is, about 3.5% in weight ratio. However, it decomposes into La and $MgH_2$ during the hydrogen desorption process, that is, hydrogen absorption and desorption do not progress reversibly.

Alloy hydrides are generally in a metastable state. Accordingly, the intermetallics' hydrides change into an amorphous state to be more stable thermodynamically or decompose disproportionately into hydrides of elemental metals while hydrogen absorption and desorption progress at a high temperature. $LaNi_5$ is peculiar because it absorbs and desorbs hydrogen reversibly near room temperature, and $Mg_2Ni$ is the only alloy that stably absorbs and desorbs hydrogen at a high temperature of 250° C. Accordingly, two characteristics are required for new hydrogen storage alloys to be developed in the future: 1) No denaturation or decomposition occurs in absorbing and desorbing hydrogen and 2) hydrogen desorption is possible at room temperature, in other words, 1) high stability to hydrogenation of alloy and 2) instability of formed hydrides.

In alloys showing a high desorbing temperature, namely, low hydrogen dissociation pressure, hydrogen atoms at special interstices in crystal lattices make strongly bonds with metal atoms to form a stable hydride. Accordingly, the hydrogen desorbing temperature does not lower so much through "partial substitution method" of substituting a portion of constituent atoms with other atoms, namely, through forming a pseudo-binary alloy by merely making it having multiple components. Further, although a method of disturbing the metallographic structure by a mechanical treatment has often been also attempted in recent years, this is not effective essentially, for example, because it decreases the rechargeable hydrogen storage capacity. Accordingly, in order to enhance the stability to hydrogenation and instability of hydrides, it is necessary to strengthen bonds between metal atoms and greatly lower the chemical binding strength between metal and hydrogen atoms through drastical change of the composition and the crystal structure.

SUMMARY OF THE INVENTION

In view of the present state of the art and requirements to be demanded in the future as above-mentioned, it is a primary object of the present invention to provide a novel hydrogen storage alloy having a large amount of rechargeable hydrogen storage capacity per unit weight and being excellent in the reversibility of hydrogen absorption and desorption, through enhancement of the stability of an alloy hydride comprising a light metal element as main ingredient and, at the same time, increase of the hydrogen dissociation pressure of the hydride.

In view of the present state of the art and the requirements to be demanded in the future as above-described, the present inventors have made earnest studies on the metallographic and crystallographic structure of hydrogen storage alloys, and investigated on reactivity thereof with hydrogen. As a result thereof, they found that a novel ternary alloy having a specific phase provides an excellent performance as a hydrogen storage material, to accomplish the present invention.

The foregoing object can be attained in accord with the invention by an $AB_2C_2$-type ternary hydrogen storage alloy comprising as main ingredient an $AB_xC_y$ phase in which A comprises at least one of a rare-earth element and Ca, B mainly comprises Mg, and C comprises at least one of transition metal elements of Cu, Ni, Co, Fe, Cr, Mn, Ti, V and Zn, x and y representing values within the ranges of $1.5 \leq x \leq 2.5$ and $1.5 \leq y \leq 3.5$, respectively.

In the $AB_2C_2$ ternary hydrogen storage alloys, each of x and y for $AB_xC_y$ in the crystal structure can be 2 in which A, B and C are as above-described.

As stated above, the ternary hydrogen storage alloy of the invention has a structure comprising three kinds of elements and includes a pseudoternary crystal system wherein the elements are partially or entirely substituted in accordance with the definition described above.

In the $AB_2C_2$ ternary hydrogen storage alloy, the element constituting each of the phases or a portion thereof can be substituted with each of elements defined below. Namely, a preferred embodiment of the invention may include the $AB_2C_2$ phase with a hexagonal crystal structure in which the A-site is occupied with at least one of the rare-earth element and Ca, the B-site is mainly occupied with Mg and the C-site is occupied with at least one of transition metal elements of Cu, Ni, Co, Fe, Cr, Mn, Ti, V and Zn.

A preferred embodiment of the invention may include the $AB_2C_2$ phase with a tetragonal $ThCr_2Si_2$-type crystal structure in which the Th-site is occupied with at least one of rare-earth element and Ca, the Cr-site is mainly occupied with Mg and the Si-site is occupied with at least one of transition metal elements of Cu, Ni, Co, Fe, Cr, Mn, Ti, V and Zn.

In the $AB_2C_2$ phases described above, Mg may be partially substituted with Al and/or Si in the B-site, and the transition metal element can be substituted with Al and/or Si in the C-site.

The $AB_2C_2$-type ternary hydrogen storage alloy can be manufactured by reaction-sintering an alloy starting material represented by the total chemical formula $AB_xC_y$ at a temperature of 400 to 1,000° C., where A comprises at least one of the rare-earth element and Ca, B mainly comprises Mg and C comprises at least one of transition metal elements of Cu, Ni, Co, Fe, Cr, Mn, Ti, V and Zn, x and y representing values within the ranges of $1.5 \leq x \leq 2.5$ and $1.5 \leq y \leq 3.5$, respectively.

In a preferred embodiment, the $AB_2C_2$-type ternary hydrogen storage alloy can be manufactured by combining two or three kinds of ingredients A, B and C as a portion of the alloy starting material, where A comprises at least one of a rare-earth element and Ca, B mainly comprises Mg, and C comprises at least one of transition metal elements of Cu, Ni, Co, Fe, Cr, Mn, Ti, V and Zn.

Further, the invention provides an $AB_2C_3$-type ternary hydrogen storage alloy mainly consisting of $AB_2C_3$ phase, in which the A-site is occupied with at least one of the rare-earth element and Ca, the B-site is mainly occupied with Mg and the C-site is occupied with at least one of transition metal elements of Cu, Ni, Co, Fe, Cr, Mn, Ti, V and Zn.

In the $AB_2C_3$ ternary hydrogen storage alloy, the element constituting each of the phases or a portion thereof can be substituted with each of elements defined below.

Namely, in a preferred embodiment of the $AB_2C_3$-type ternary hydrogen storage alloy of the invention, a composition as the entire alloy is represented by an $AB_xC_y$ phase in which the A-site is occupied with at least one of the rare-earth element and Ca, the B-site is mainly occupied with Mg and the C-site is occupied with at least one of transition metal elements of Cu, Ni, Co, Fe, Cr, Mn, Ti, V and Zn, x and y representing values within the ranges of $1.5 \leq x \leq 2.5$ and $2.5 \leq y \leq 3.5$, respectively.

Namely, a preferred embodiment of the invention may include the $AB_2C_3$ phase with a hexagonal crystal structure in which the A-site is occupied with at least one of the rare-earth element and Ca, the B-site is mainly occupied with Mg and the C-site is occupied with at least one of transition metal elements of Cu, Ni, Co, Fe, Cr, Mn, Ti, V and Zn.

In the $AB_2C_3$ phases described above, Mg may be partially substituted with Al and/or Si in the B-site and the transition metal element can be substituted with Al and/or Si in the C-site.

The $AB_2C_3$-type ternary hydrogen storage alloy can be produced by reaction-sintering an alloy starting material represented by the entire compsition formula $AB_xC_y$ at a temperature of 400 to 1,000° C., where A comprises at least one of a rare-earth element and Ca, B mainly comprises Mg and C comprises at least one of transition metal elements of Cu, Ni, Co, Fe, Cr, Mn, Ti, V and Zn, x and y representing values within the ranges of $1.5 \leq x \leq 2.5$ and $2.5 \leq y \leq 3.5$, respectively.

The production process described above can be also performed by use of a composite which is mixed beforehand with two or three kinds of elements A, B and C as a portion of the alloy starting material, where A comprises at least one of the rare-earth element and Ca, B mainly comprises Mg and C comprises at least one of transition metal elements of Cu, Ni, Co, Fe, Cr, Mn, Ti, V and Zn.

DETAILED DESCRIPTION OF THE PREFERRED EMBODIMENTS

Figure 1:
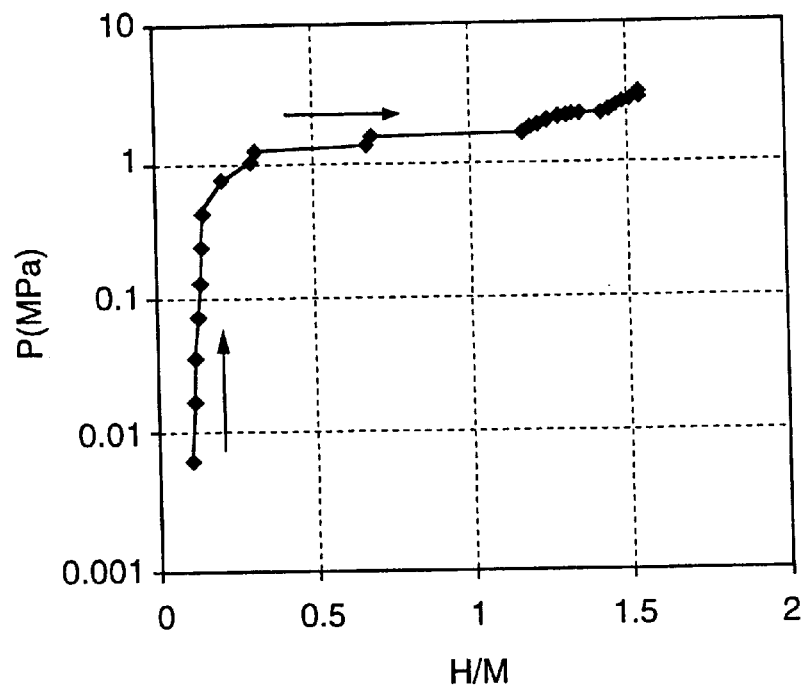
FIG. 1 is a graph showing a hydrogen pressure-composition isotherm (absorbing curve) of an $LaMg_2CU_2$ alloy at 250° C. in Example 1.

The present invention relates to a novel ternary hydrogen storage alloy having an enhanced stability in hydrogenation and rechargeable hydrogen storage capability per unit weight which is remarkably improved by formation of an unstable hydride. According to the invention, this novel alloy is provided by adding a specific transition metal element to a rare-earth-Mg or the Ca-Mg system alloys of which the hydrogen desorbing temperature is relatively high, while it basically has large hydrogen storage capability, and which tends to form a stable hydride in the hydrogen desorption process.

The present invention includes a ternary hydrogen storage alloy comprising at least basic three kinds of metal elements A, B and C and consisting of an $AB_2C_2$ and/or $AB_2C_3$ phase as a main ingredient.

Further, in the present invention, quaternary or more multi-component alloys can also be formed by partially substituting at least one of elements A, B and C in the above ternary alloy composition. In this case, it is possible to change the crystal structure of the alloy and control the hydrogen storage characteristics thereof.

The element A comprises at least one element selected from rare-earth elements and Ca. As the rare-earth element, La, Ce, Pr, Nd, Sm and Gd are preferably useful. As the element A, misch metal (Mm) as a mixture of rare-earth elements can be used.

As the element B, Mg is essential. Presence of Mg is not only important for forming the $AB_2C_2$ and/or $AB_2C_3$ phase but also increasing the hydrogen storage capability. The element B may be constituted entirely with Mg, or a portion of Mg (a range less than 25%) may be substituted with at least one of Al, Si and the like. "The element B mainly comprising Mg" in this specification includes both of the cases where the element B is entirely constituted with Mg and a case where Mg is partially substituted with other element described above.

The element C comprises at least one of transition metal elements of Cu, Ni, Co, Fe, Cr, Mn, Ti, V and Zn. The element C may comprise only one, two or more of such elements. Further, the element C may be partially substituted with Al and/or Si. In this substitution, the kind and the amount of substituents may be selected properly according to requested hydrogenation characteristics.

In the invention, the alloys comprising the $AB_2C_2$ phase as the main ingredient have various compositions and crystal structures by properly combining each group of elements of A, B and C defined as above.

In the hydrogen storage alloy material comprising the $AB_2C_2$ phase as the main phase according to the invention, the alloy preferably has an entire composition represented by $AB_xC_y$, where A comprises at least one of a rare-earth element and Ca, B mainly comprises Mg and C comprises at least one of transition metal elements of Cu, Ni, Co, Fe, Cr, Mn, Ti, V and Zn, x and y preferably representing values within the ranges of $1.55 \leq x \leq 2.5$ and $1.5 \leq y \leq 3.5$, respectively. The hydrogen storage alloy material comprising the $AB_2C_2$ phase as the main phase can be formed more reliably by selecting the composition range.

The alloy comprising the $AB_2C_3$ phase as the main phase in the invention also have various compositions and crystal structures by properly combining each group of elements A, B and C defined above in the same manner as the alloy comprising the $AB_2C_2$ phase as the main ingredient except for increasing the addition ratio (x in $AB_xC_y$) of the element C from 2 to 3.

In the hydrogen storage alloy material comprising the $AB_2C_3$ phase as the main phase according to the invention, it is preferred that the composition for the entire alloy is represented by $AB_xC_y$, where A comprises at least one of a rare-earth element and Ca, B mainly comprises Mg and C comprises at least one of transition metal elements of Cu, Ni, Co, Fe, Cr, Mn, Ti, V and Zn, x and y representing values within the ranges of $1.5 \leq x \leq 2.5$ and $2.5 \leq y \leq 3.5$, respectively. A hydrogen storage alloy material comprising the $AB_2C_3$ phase as the main phase can be formed more reliably by selecting the composition range.

The hydrogen storage alloy of the invention may contain other intermetallics phases than the $AB_2C_3$ and/or the $AB_2C_3$ phase as the main phase (usually contained by 50% or more) insofar as the desired effects according to the present invention can be attained.

While the hydrogen storage alloy according to the present invention usually has a hexagonal crystal structure, not only the crystal structure but also the lattice parameters can be controlled depending on the kind of the constituent ingredients and the degree of the partial substitution. For example, while the crystal structure of $LaMg_2Cu_2$ alloy is hexagonal, that of an $LaMg_{1.7}Al_{0.3}CuTi$ alloy in which the ingredient elements are greatly substituted changes to a tetragonal $ThCr_2Si_2$-type. Change of the crystal structure and the control of the lattice parameters by partial substitution are effective for the enhancement of the stability in hydrogenation and/or improvement in hydrogen storage characteristics.

In the present invention, a mixture which the ingredients of elements A, B and C are blended can be also used as the starting material. For example, when an $LaMg_2Cu_2$ alloy of the invention is manufactured, a mixture of powdery metals of La, Mg and Cu can be used as the starting material. Since the powdery elemental metals are oxidized easily in general and they are not available easily as fine powders, it is sometimes difficult to attain homogeneous alloy by reaction-sintering for once. In such a case, it is preferred to obtain a desired alloy by repeating the step of sintering (or melting)-pulverization for several times.

Alternatively, in the invention, an alloy mixture comprising a plurality of preliminary alloy powders containing two or more of elements A, B and C respectively can be also used as the alloy starting material. For example, corresponding to the composition of desired hydrogen storage alloy material, two, three or more of powdery alloy A-B, B-C, A-C, A-B-C and the like may be mixed at predetermined ratio and can be used as the alloy starting material. Such alloy powders are more advantageous than powdery metals, because they are excellent in oxidation resistance and are available easily as fine powders. In particular, it is preferred to use the alloys such as rare-earth element-Cu, rare-earth element-Ni, Ca—Cu, Ca—Ni, Mg—Cu, Ca—Mg—Cu, Ca—Mg and rare-earth element-Mg. Such alloys can include, for example, $LaCu_2$, $LaNi_2$, $CaNi_2$, $MgNi_2$, $Mg_2Ni$, $MmNi_2$, $CaCu_2$, $CaMg_2$ and $LaMg_2$. Further, quaternary or higher multi-component alloys and alloys comprising composite phases can also be used as the alloy starting material.

The hydrogen storage alloy according to this invention can not sometimes be prepared by a melting method. In such a case, a desired hydrogen storage alloy can be prepared reliably also by reaction-sintering the material comprising an $AB_xc_y$ composition described above. Further, synthesis of single crystals is possible in various compositions. The starting material should be preferably provided in a powdery or granular state. A particle of the starting material is preferably fine, but it is desirable to adjust the average grain size to about 1–10 μm from a practical point of view.

The starting materials can be mixed by using a known apparatus such as a ball-mill. When at least a portion of an atmospheric gas is substituted with hydrogen during mixing, since pulverization and homogenization of the starting materials can be conducted easily while suppressing oxidation, a desired alloy can be obtained through a sintering process at a lower temperature and in a shorter time.

The temperature in the reaction-sintering may be selected properly depending on the alloy composition and usually it is about 400 to 1,000° C. and preferably, about 450 to 750° C. Sintering is usually carried out in an inert gas atmosphere (He and Ar or $N_2$) or under vacuum. Further, when hydrogen is present in the sintering atmosphere, previously hydrogenated alloy can be produced directly.

After the reaction-sintering, the sintered product may be pulverized as required and sintered again as described above. The sintering-pulverization process may be repeated twice or more depending on the composition of the alloy used. Pulverization after sintering may be performed also by using a known apparatus such as a ball-mill.

Further, after sintering, annealing may be carried out as required. The annealing temperature may be set properly depending on the alloy composition, for example.

By an appropriate combination of element species A and B forming a stable hydride and an element species C not easily forming the hydride, the $AB_2C_2$- and $AB_2C_3$-type alloys of the invention can attain improvement in or relating to either the stability in hydrogenation of the alloy or formation of unstable hydride.

Since the $AB_2C_2$- and the $AB_2C_3$-type ternary alloys according to the invention contain relatively lightweight element Mg or Ca and a 3d transition metal element, it can provide an effect for increasing the hydrogen storage capacity per unit weight.

In addition, since the interlattice sites occupied with the element in the A- and the B-site can be partially substituted with other elemental ingredients, the hydrogen storage characteristics can be changed optionally and a hydrogen storage alloy corresponding to the intended use can be produced. That is, by introducing a transition metal element into the crystal lattice containing Mg, rare-earth element or Ca liable to form a hydride, electron donation from Mg to hydrogen is moderated, and an effect of enhancing the stability of the alloy can be attained. As a result, more excellent hydrogen storage characteristics can be obtained attributable to the reversibility of hydrogen absorption and desorption.

The $AB_2C_2$- and $AB_2C_3$-type ternary hydrogen storage alloys of the invention are useful as a hydrogen storage medium in a fixed or portable hydrogen storing vessel and a hydrogen fuel tank in a hydrogen automobile or fuel cell-driven electric automobile.

Now, features of the invention will be made more clearly appearing with reference to examples. Preparation of alloy specimen in examples, and analysis of the crystal structure and measurement of the hydrogenation-dehydrogenation characteristics were performed as below.

(1) Preparation of Alloy Specimen

After homogeneously mixing powdery metals or powdery alloy material (particle size: 1–10 $\mu$m) to obtain a predetermined alloy composition in a ball-mill, and press-molding mixture into pellets, the resultant pellets were placed in a stainless tubular reactor, heated at 500 to 650° C. for about 2 hours in an Ar atmosphere at 0.6 MPa in order to alloy them in a solid phase. Then, the resultant sintered products were pulverized and the obtained powdery specimen was sintered again. The above procedures were repeated for further five times to obtain an alloy specimen.

Storage of starting material and the alloy specimen, and operation such as preparation of pellets and pulverization of the sintered products were carried out in a glove box in an Ar atmosphere.

The purity of each of metals as the starting material was not less than 99%.

(2) Observation and Crystal Structure Analysis Thereof

The metallographic structure of the alloy specimen was observed by a scanning electron microscope. Further, the crystal structure was analyzed by a powder X-ray diffractometry using a Guinier-Hagg camera. The method was as follows: 1) taking X-ray diffraction photograph with high accuracy, 2) expressing numerically the X-ray diffraction data by means of a computer-controlled monochromatic micro-densitometer designed for the photography, 3) optimally analyzing the crystal structure using a software developed especially therefor, and finally, 4) the crystal structure was refined by Rietveld analyzing method and crystal parameters therewith were confirmed.

(3) Hydrogenation-dehydrogenation Characteristics

Occurrence of absorption and desorption of hydrogen, temperature therefor and hydrogenation stability of alloy were examined by means of high pressure differential thermal analysis (DTA) in a hydrogen atmosphere. The hydrogen pressure was set to 2 MPa. The hydrogen storage capacity, as well as hydrogen pressure-composition isotherms(P-C-T characteristics) were evaluated by using a Sieverts'-type automatic P-C-T measuring system.

EXAMPLE 1

After press-molding two kinds of mixed powder, (1) La:Mg:Cu=1:2:2 in an molar ratio and (2) $LaMg_2$:Cu=1:2 in molar ratio, as the alloy starting materials and obtaining pellets, the pellets were sintered in accordance with the procedures described above to obtain desired alloys. An alloy containing inntermetallic compound $LaMb_2Cu_2$ as main phase was formed from either (1) or (2) described above.

According to the crystal structure analysis, it was verified that the formed $LaMg_2Cu_2$ belongs to the hexagonal system and has unit cell parameters of a=0.51862 nm and c=1.9799 nm (c/a=3.82).

As a result of the DTA measurement under a high pressure hydrogen atmosphere, it was found that the alloys having the composition and the crystal structure described above have a hydrogen storageability.

Figure 2:
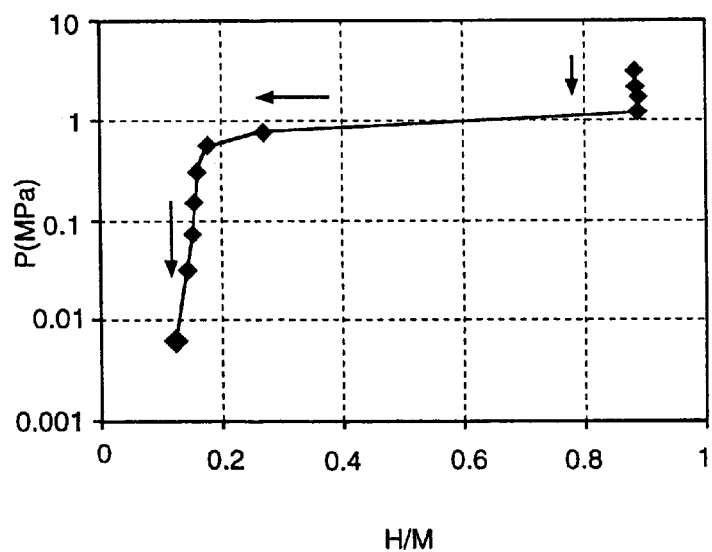
FIG. 2 is a graph showing a hydrogen pressure-composition isotherm (desorbing curve) of an $LaMg_2Cu_2$ alloy at 270° C.) in Example 1.
Figure 3:
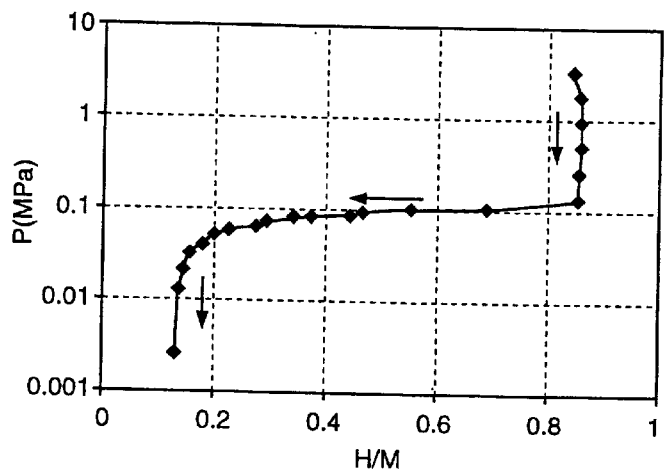
FIG. 3 is a graph showing a hydrogen pressure-composition isotherm (desorbing curve) of an $LaMg_2Cu_2$ alloy at 190° C. in Example 1.

FIG. 1 shows a hydrogen storage capacity determined by using a P-C-T characteristics measuring apparatus. More in details, hydrogen storage capacity was H/M=1.5 or more in the atomic molar ratio between hydrogen atoms H and metal atoms M, that is, about 2.4% in weight ratio at 250° C. and under a hydrogen pressure of 3.3 MPa respectively. Then, as shown in FIG. 2 and FIG. 3, at 270° C. and 190° C. they showed hydrogen dissociation pressures of about 1 MPa and 0.1 MPa respectively and about half (1.2% by weight) of the absorbed hydrogen was desorbed.

For reference, the hydrogen storage capacity H/M is about 1 and hydrogen desorbing temperature at 0.1 MPa is about 250° C. with the known $Mg_2Ni$. Thus, it can be seen that $LaMg_2Cu_2$ of the invention absorbs more hydrogen and lower hydrogen desorbing temperature by about 60° C. than the $Mg_2Ni$.

EXAMPLE 2

$LnMg_2Cu_2$ alloys in which La in $LaMg_2Cu_2$ was substituted with other rare-earth element Ln (Ln=Ce, Pr, Nd, Sm and Gd) were prepared by the same reaction-sintering method as in Example 1. Each of the obtained alloys had a hexagonal crystal structure similar to that of $LaMg_2Cu_2$.

Figure 4:
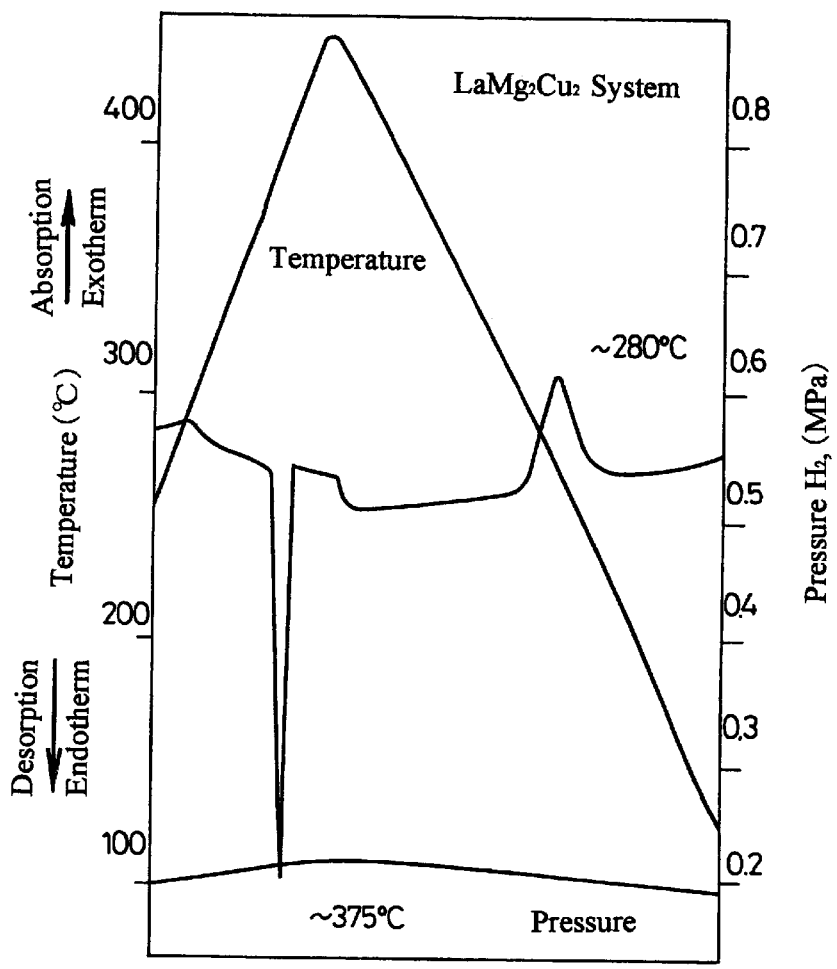
FIG. 4 is a graph showing a differential thermal analysis (DTA) data in Example 2.

As a result of DTA measurements for the alloys at a hydrogen pressure of 2 MPa, exothermic peak was observed at about 280° C. and endothermic peak was observed at about 375° C. substantially in the same manner as the $LaMg_2Cu_2$ alloy (refer to FIG. 4). The peaks show heat of reaction due to absorption and desorption of hydrogen respectively. Accordingly, it is estimated that $LnMg_2Cu_2$ alloys have crystal structures and hydrogenation characteristics not so much depending on the kinds of the rare-earth element Ln.

EXAMPLE 3

$CaMg_2Cu_2$ alloys in which La in $LaMg_2Cu_2$ was substituted with Ca were prepared by the same reaction-sintering method as in Example 1. Since La and Ca have a radius of metal atoms substantially identical with each other and since similarity is present of the crystal structure and the hydrogenation characteristic in a series of intermetallic compound of La and Ca with $LaNi_5$ and $CaNi_5$ being as representatives, it is predicted that $CaMg_2Cu_2$ alloys have crystal structure and hydrogenation characteristics similar to those of the $LaMg_2Cu_2$ alloys.

EXAMPLE 4

$LaMg_2Cu_{2-y}C_y$ alloys in which Cu in $LaMg_2Cu_2$ was partially substituted with other elements C (Ni, Co, Fe, Cr, Mn, Ti, V, Al and/or Si) was prepared by the same reaction-sintering method as in Example 1.

In the $LaMg_2Cu_{2-y}C_y$ alloy composition, when the element C is other than Ti and V, the upper limit of the substitution amount, y, can usually be up to about 0.2 and the alloys comprised a hexagonal crystal structure similar to $LaMg_2Cu_2$. On the contrary, when the element C is Ti and/or V, the upper limit of the amount of substitution is about 1.5 for each of them (preferred amount of substitution is about 1.0). Then, with increase in the amount of substitution, the crystal system changed from the hexagonal to the tetragonal crystals. As a result of this example, it can be confirmed that the stability against repeating absorption and desorption of hydrogen can be improved by partially substituting Cu in the $LaMg_2Cu_2$ alloy properly with other elements C.

EXAMPLE 5

Figure 5:
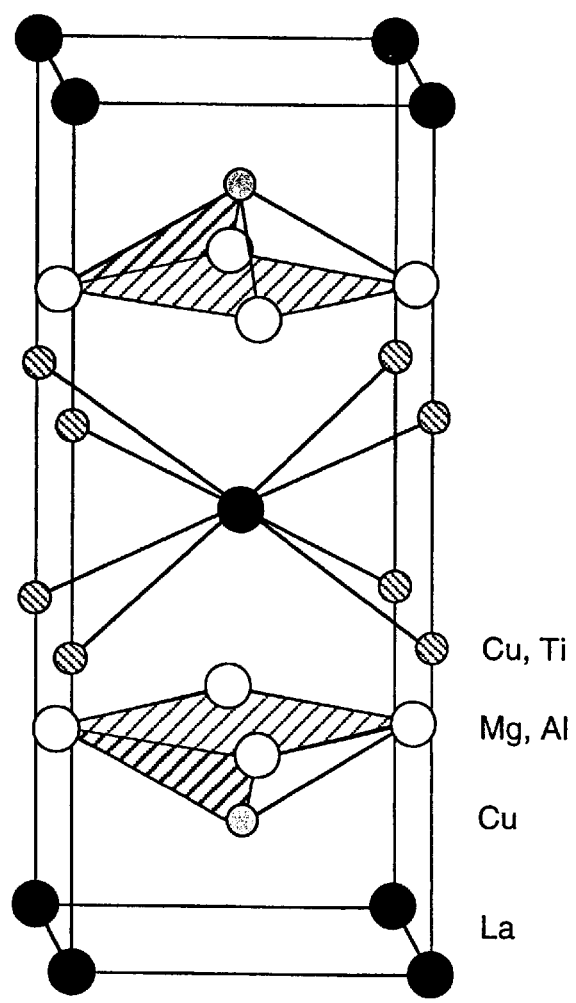
FIG. 5 is a graph showing a crystal structure of $LaMg_{1.7}Al_{0.3}CuTi$ with a tetragonal $ThCr_2Si_2$-type structure in Example 5.

When Mg and Cu in the $LaMg_2Cu_2$ alloy were partially substituted respectively with Al and Ti to improve the stability of the alloy, the crystal structure of the alloy changed from the hexagonal to tetragonal system as a result of analysis. For example, it was analyzed that an alloy comprising a composition of $LaMg_{1.7}Al_{0.3}CuTi$ has a tetragonal $ThCr_2Si_2$-type structure (refer to FIG. 5). The $ThCr_2Si_2$-type structure is characteristically a stoichiometric intermetallic compound $AB_2C_2$ comprising A for elemental species of a rare-earth element, alkaline-earth metal or alkali, B for elemental species of transition metal or alkaline-earth metal and C for elemental species belonging to group IIIA, IVA or VA on the periodic table, and such compounds with the structure are noted for the abnormal physical characteristics thereof.

Figure 6:
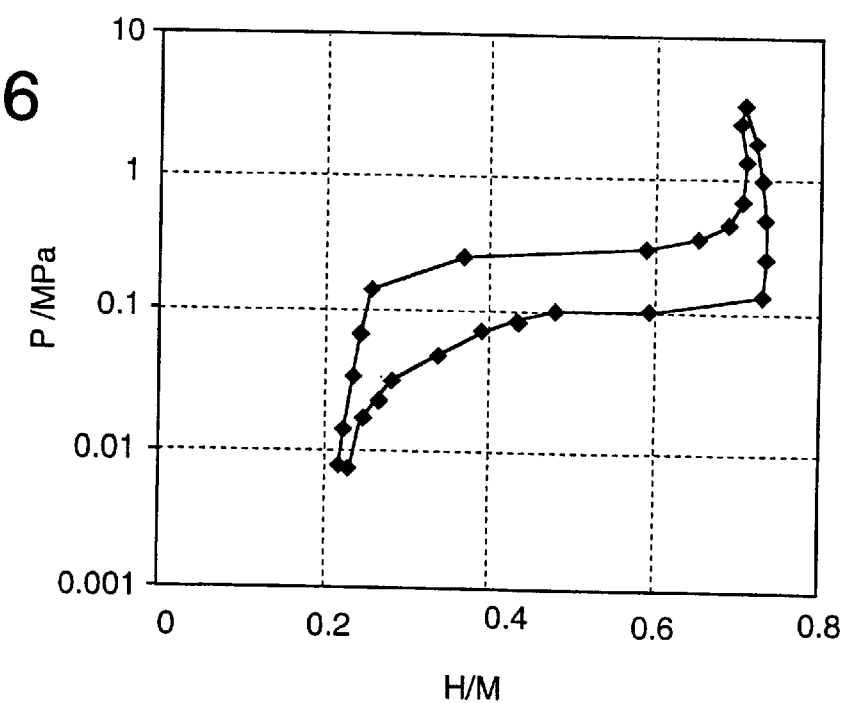
FIG. 6 is a graph showing a hydrogen pressure-composition isotherm of an $LaMg_{1.7}Al_{0.3}CuTi$ alloy at 190° C. in Example 5.

The alloy of the composition of $LaMg_{1.7}Al_{0.3}CuTi$ of the invention could be produced by reaction-sintering them at a temperature of 500 to 700° C. and then rapidly cooling the same. The alloy is extremely stable to repeating absorption and desorption of hydogen and shows P-C-T characteristics at 100° C. as shown in FIG. 6. The rechargeable hydrogen storage capacity is as small as about 0.55 by atomic ratio H/M (about 0.9% by weight), but the hydrogen dissociation pressure is about at 0.1 MPa which is lowered by about 60° C. compared with $Mg_2Ni$. The results qualitatively agree with the Miedema's experiential law, that is, "as the alloy is more stable, the hydride thereof is more unstable".

EXAMPLE 6

When an alloy increased the Cu compositional ratio in the $LaMg_2Cu_2$ alloy was prepared by the reaction-sintering method according to the method in Example 1, an $AB_2C_3$-type $LaMg_2Cu_3$ alloy phase was precipitated. The alloy also had a hexagonal crystal structure and the stability in hydrogenation increased.

Further, in the $LaMg_2Cu_{2.84}Al_{0.16}$ alloy in which Cu in the $LaMg_2Cu_2$ alloy was partially substituted with Al, it was possible to grow single crystals thereof.

Further, also in alloys in which La in the $LaMg_2Cu_3$ alloy was substituted with other rare-earth elements Ln (Pr, Nb, and Sm), the alloys having an $AB_2C_3$-type stoichio-metric composition and a hexagonal crystal structure were formed. Table 1 shows crystal parameters in comparison.

TABLE 1

|  | a (Å) | c (Å) | c/a | V (Å$^3$) |
|---|---|---|---|---|
| $LaMg_2Cu_{2.84}Al_{0.16}$ | 5.3639 (6) | 4.2109 (8) | 0.785 | 104.9 |
| $LaMg_2Cu_{2.84}Al_{0.36}$ | 5.3530 (2) | 4.2082 (1) | 0.786 | 104.6 |
| $LaMg_2Cu_{1.84}Al$ | 5.3317 (9) | 4.2010 (3) | 0.788 | 104.0 |
| $PrMg_2Cu_{2.84}Al_{0.16}$ | 5.2944 (3) | 4.1811 (4) | 0.789 | 101.5 |
| $NdMg_2Cu_{2.84}Al_{0.16}$ | 5.2691 (6) | 4.1778 (6) | 0.793 | 100.5 |
| $SmMg_2Cu_{2.84}Al_{0.16}$ | 5.2304 (5) | 4.1577 (5) | 0.795 | 98.5 | a- and c-axis unit lengths decrease and the crystal lattice volumes reduce as the atomic radius of rare-earth element goes smaller.

What is claimed is:

1. A hydrogen storage alloy comprising as a main ingredient an $AB_xC_y$ phase, in which A comprises at least one element selected from the group consisting of rare-earth elements and Ca, B mainly comprises Mg, and C comprises at least one transition metal element selected from the group consisting of Cu, Ni, Co, Fe, Cr, Mn, Ti, V and Zn, x and y representing values within the ranges of $1.5 \leq x \leq 2.5$ and $1.5 \leq y \leq 3.5$, respectively.

2. The hydrogen storage alloy as defined in claim 1, wherein the alloy is entirely represented by the $AB_xC_y$ phase.

3. The hydrogen storage alloy as defined in claim 1 or 2, wherein the $AB_xC_y$ phase has a hexagonal crystal structure.

4. The hydrogen storage alloy as defined in claim 1 or 2, wherein the $AB_xC_y$ phase has a tetragonal $ThCr_2Si_2$-type crystal structure.

5. The hydrogen storage alloy as defined in claim 3, wherein said Mg is partially substituted with Al and/or Si, the transition metal element is partially substituted with Al and/or Si.

6. A hydrogen storage alloy comprising as a main ingredient an $AB_xC_y$ phase, in which A comprises at least one element selected from the group consisting of rare-earth elements and Ca, B mainly comprises Mg, and C comprises at least one transition metal element selected from the group consisting of Cu, Ni, Co, Fe, Cr, Mn, Ti, V and Zn, x and y representing values within the ranges of $1.5 \leq x \leq 2.5$ and $2.5 \leq y \leq 3.5$, respectively.

7. The hydrogen storage alloy as defined in claim 6, wherein the alloy is entirely represented by the $AB_xC_y$ phase.

8. The hydrogen storage alloy as defined in claim 6 or 7, wherein the $AB_xC_y$ phase has a hexagonal crystal structure.

9. The hydrogen storage alloy as defined in claim 8, wherein said Mg is partially substituted with Al and/or Si, the transition metal element is partially substituted with Al and/or Si.

* * * * *